S. A. ASQUITH.
GEAR SHIFTING MECHANISM.
APPLICATION FILED FEB. 1, 1915.
1,229,206.
Patented June 12, 1917.
3 SHEETS—SHEET 2.
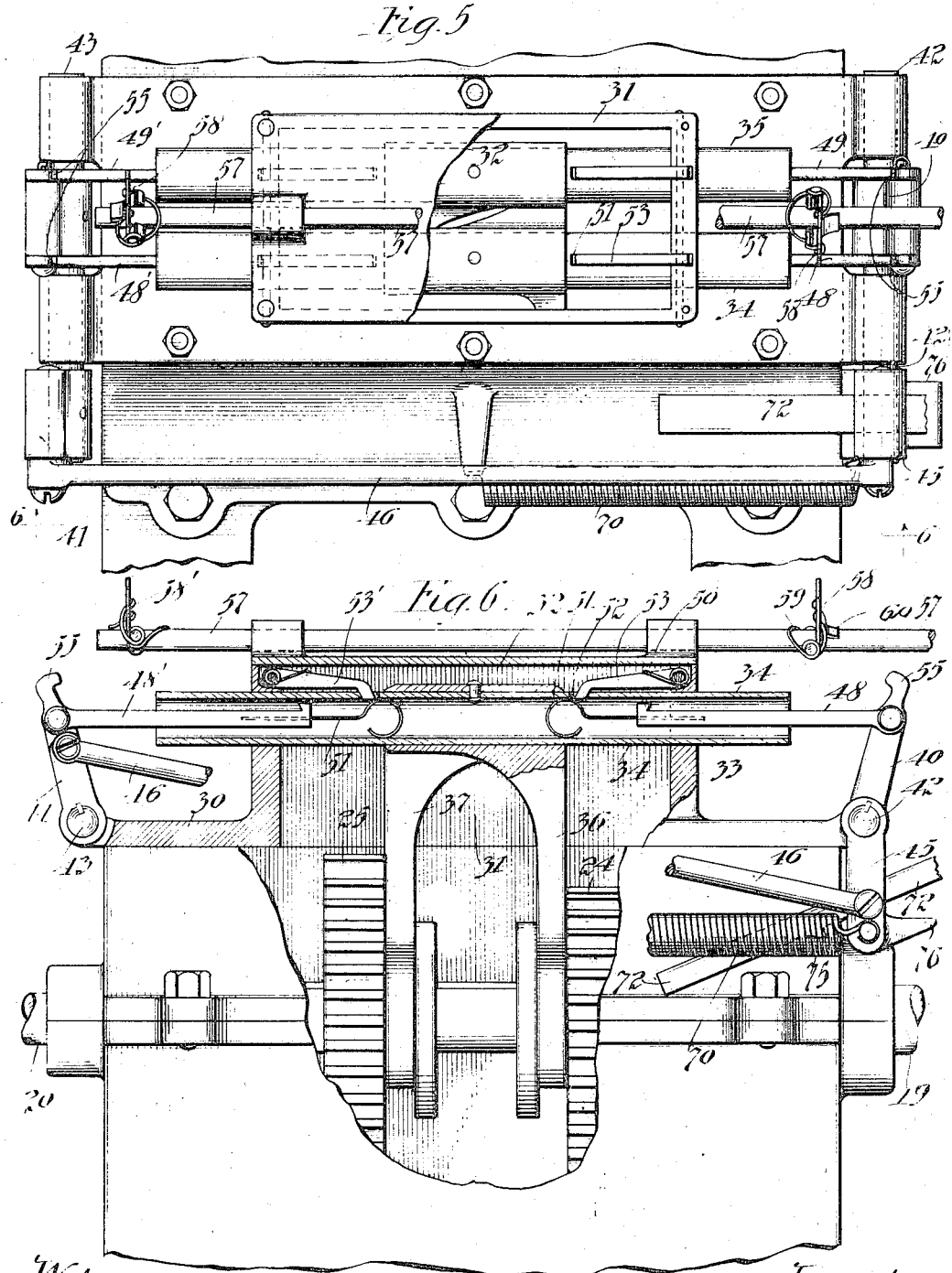

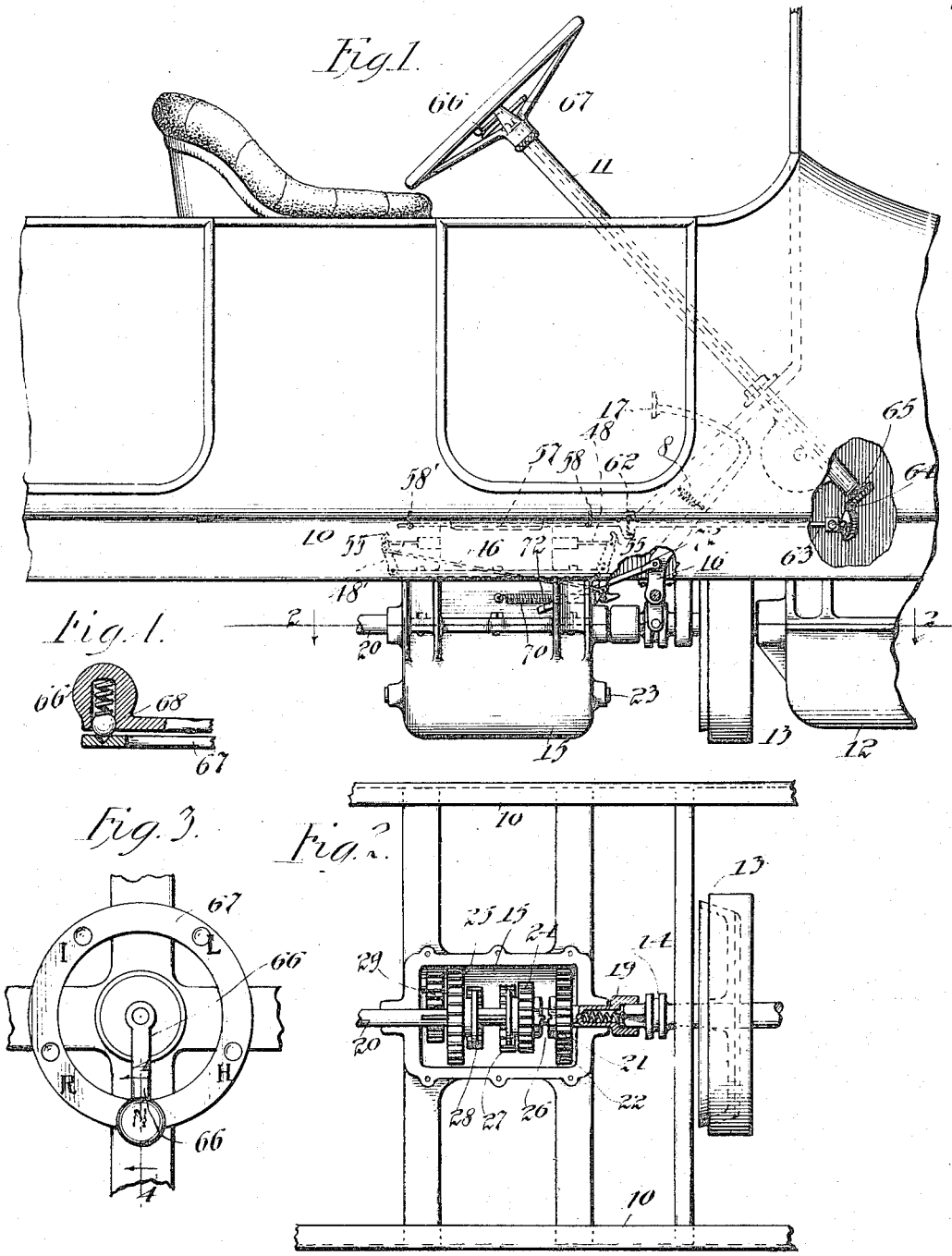

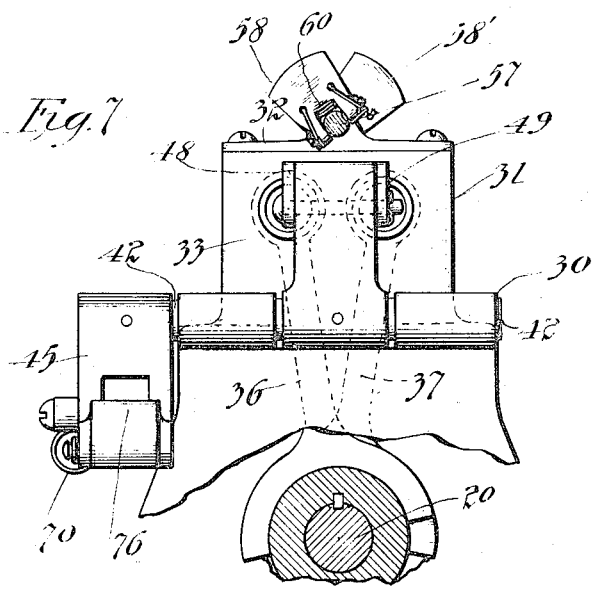
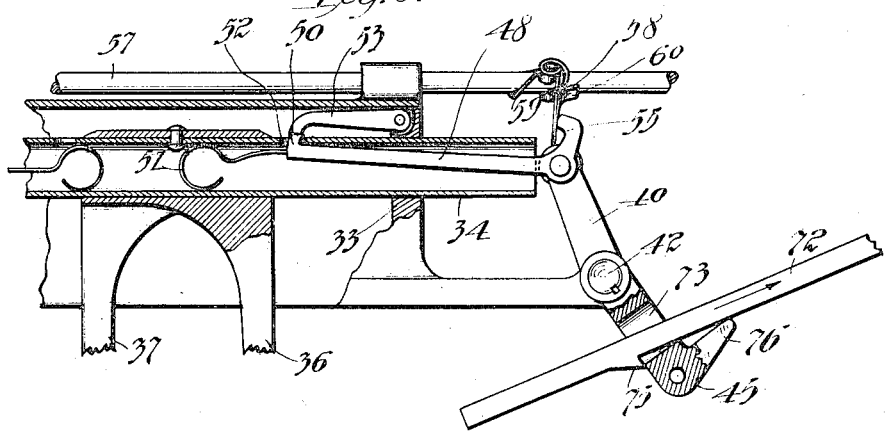

UNITED STATES PATENT OFFICE.

STEAD A. ASQUITH, OF WATERLOO, IOWA.

GEAR-SHIFTING MECHANISM.

1,229,206.

Specification of Letters Patent.  Patented June 12, 1917.

Application filed February 1, 1915. Serial No. 5,512.

*To all whom it may concern:*

Be it known that I, STEAD A. ASQUITH, a citizen of the United States, residing at Waterloo, in the county of Blackhawk and State of Iowa, have invented certain new and useful Improvements in Gear-Shifting Mechanism, of which the following is a specification.

My invention relates to improvements in gear shifting mechanism, and more particularly to mechanism for use upon an automobile to shift selective-type gearing to any of its desired gear-relations.

One of the general objects of my invention is to provide a mechanism which is simple, cheap, and rugged, and, which in operation, is efficient, positive and easily manipulated.

Among the special objects of my invention are to provide a shifter apparatus that is applicable and operable in conjunction with standard selective-gear mechanisms; that may be set preparatory to securing desired gear-relation while the automobile is running; that, upon operation to effect its gear shifting function in accordance with the selective setting, will insure preliminary release of the automobile clutch, and also a restoration of the transmission gearing to neutral position, before effecting the movement of the gears to bring about their coöperation in the newly-selected relation; and that will positively lock, in neutral position, the shiftable gear element that is not in use under any given gear-relation.

In the drawings wherein I have illustrated an embodiment of my invention—

Figure 1 is a side elevation with parts broken away, showing in schematic fashion the application of my invention in conjunction with an automobile.

Fig. 2 is a section on line 2—2 of Fig. 1.

Fig. 3 is a detail of a convenient gear setting lever arrangement;

Fig. 4 is a section on line 4—4 of Fig. 3;

Fig. 5 is a plan view, with parts broken away, of the shifter mechanism;

Fig. 6 is a vertical section on line 6—6 of Fig. 5.

Fig. 7 is an end elevation of the shifter mechanism.

Fig. 8 is a detail section illustrating a position in operation; and

Fig. 9 is a detail of a tripping wing arrangement.

Of the automobile parts, shown in Fig. 1 and that, *per se*, constitute no part of my present invention, 10 indicates an automobile frame, 11 the steering post, 12 an engine, 13 a clutch, having a shiftable element 14, and 15 a suitably arranged selective-type transmission gearing. These parts are represented schematically, for simplicity, rather than with regard to best available commercial forms, the clutch 13, for instance, being shown as a simple cone clutch with its shiftable element 14 acted upon by a clutch-shifting lever 16, having a foot treadle 17 and normally held in "clutch-in" position by a spring 18. This showing merely typifies a suitable organization of usual parts of an automobile.

The selective type transmission, 15, is illustrated as providing the two coaxial drive-shaft sections 19 and 20, section 19 carrying the pinion 21 that drives gear 22 on jack shaft 23, and section 20 carrying the two shiftable gear members 24 and 25 that may be moved from their neutral mid-positions, shown in Fig. 2, to effect the desired gearing relation. The shiftable gear 24 is movable to the right, (Fig. 2) for "high" or third-speed connections through the one-to-one connection clutch 26, and is movable to the left for intermediate or second-speed connection to jack shaft gear 27, while correspondingly, shiftable member 25 is movable to the right into "low" or first-speed-forward connection through gear 28 and to the left for connection with reversing pinion 29. The construction of transmission is unimportant to my invention, except generally in the provision of two shiftable gear members, each shiftable, from a central, neutral position, in opposite directions to control two speeds or gearing relations, thus giving the customary four-speeds and "neutral" combinations to be effected.

With such a construction of transmission gear as that shown, however, the gear shifting mechanism embodying my invention may conveniently be mounted above the transmission-gear casing and may have its own supporting frame 30 take the form of a cover for the gear casing, said cover having a rectangular cupola 31 overlain by a cap-plate 32. The end walls 33 of said cupola may conveniently be used as bearing standards for shifter-parts.

To shift, axially, the respective selective gear members 24 and 25, I employ two shifter members, comprising primarily the tubular slides 34 and 35, respectively, these slides being mounted in the bearing walls 33 and in all positions extending therebeyond. Shifter arms 36 and 37 are centrally carried by the respective slides 34 and 35, and these arms make yoke engagement with the gear members 24 and 25 to move the latter. When these slides stand in the normal central position shown in Fig. 6 the two shiftable gear elements 24 and 25 are held in neutral position. These slides are normally locked in "neutral", but may be unlocked and moved, each to either extreme, by the operation of selective setting means and power applying means, both operable from the driver's station on the car.

To operate the slides I provide at opposite ends of the frame 30 slide-moving means that include rocker arms 40 and 41, fast on shafts 42 and 43, said shafts and arms being oppositely oscillatable in unison. One of said shafts, as 42, has secured thereto a lever 45 that is connected by link bar 46 to the lever 41, so that said levers 40, 41 rock toward and from the intervening slides or shifter-members in unison. When the arms 40, 41 rock inward they should, preferably, positively throw the shifter-slides, 34, 35, to neutral or mid-position. Therefore, each lever 40—41 is broad enough, preferably, to span between the slides, 34, 35, that are arranged side by side, and the levers are so disposed that at their inward limits of throw they bear against the opposite extremities of each slide member. Manifestly, then, each time the levers 40, 41 are rocked inwardly, by movement of lever 45 to the right (Fig. 6), both slides 34 and 35 are positively centered in neutral position.

Each rocker lever, 40, 41, is connectible on its instroke, by normally-disabled connection means, with either slide, and, when so connected, will carry the slide outward as the lever rocks outward. Thus, the rocking lever 40 has pivoted to its sides two connectors or hooks 48 and 49, respectively, extending into the tubular slides 34 and 35, each said hook being provided at its extremity with a nose 50, and each carrying a suitable light spring 51, as a convenient means normally to hold the hook disabled or in the idle position shown in Fig. 6, with its nose disengaged from the slide. The construction is such that when the lever 40 is rocked inward and the pawl 48 is raised, as shown in Fig. 8, hook-nose 50 may engage in an opening 52 in the top of its tubular slide, so that the lever 40 may pull the slide outward on the outward throw of the lever. The opening 52 is normally engaged by a holding pawl 53, pivoted to the wall 33 and normally acting as a one way stop to prevent outward movement of the tubular slide, but when the hook-nose 50 engages the opening 52 it displaces said pawl 53 and frees the slide for outward movement. On the lever 41, similar connectors 48' and 49' are mounted, these being in all respects duplicates of the connectors first described, and working in the same way, the appropriate holding pawls 53' being arranged, of course, oppositely to the pawls 53 so that when both pairs of holding pawls 53 and 53' engage the tubes both slides are held against movement in either direction, and are thus locked in "neutral".

Suitable selective means are provided which none of, or any selected one of, the connectors 48, etc., may be raised to operative or slide-engaging position at the will of the operator, and as one available construction to this end I prefer that each said connector be provided with a bell-crank finger 55 projecting upwardly, and that means be provided for selectively positioning an abutment in the path of inward movement of any one (or none) of said fingers 55. Thus, a selector shaft 57 is mounted in bearings on the cap 32 of the structure and on said shaft are provided two stop-wings 58 and 58' preferably disposed at an angle of 144 degrees with reference to each other and respectively located in planes of rotation that are cut by the inward movement of the fingers 55 of the opposing pairs of connectors. Each said wing is preferably pivoted to the shaft 57 and is preferably yielding somewhat in an inward direction against the tension of a spring 59, that acts normally to hold the wing forward so that a projection 60 on the wing acts against the shaft to maintain the wing normally at about right angles to the axis of the shaft.

In the neutral position of the parts shown in Fig. 6, both wings 58 and 58' are above the paths of oscillation of fingers 55 so that rocking of the lever arms 40, 41 will produce no gear changing effect. To throw the transmission gear to "neutral" from some gear-operating relation, the selector shaft is turned to this neutral position and levers 40—41 are rocked through their cycle, throwing both slides to mid position. By rotation of the shaft 57 to four successive positions, however, wing 58 may be brought successively into the paths of finger 55 for the two connectors 48 and 49, and thereafter wing 58' may similarly be positioned for coaction successively with the connectors 48' and 49'. When any wing stands in the path of movement of the finger 55 of one of the connectors, a rocking of the levers 40, 41 will on the instroke of said levers, cause the finger 55 of said connector to strike the set wing, which will rock the connector against the tension of its spring 51 to engage its hook 50 with the slide-opening 52 so that on the return throw of the rocking lever the engaged slide will be drawn out of neutral position by the connector, and accordingly the transmission gears will be brought into one of their four operative relations. The shaft 57 may then be turned to interpose a wing in the path of the finger 55 of some other connector and, upon the next rocking of the connector-carrying levers, the instroke of the levers will first restore the previously set slide to normal, neutral position and then the outstroke of the levers will cause a movement of the desired slide in appropriate direction corresponding with the setting of the selector shaft 57.

Of course both the rotation of selector shaft 57, and the actuation of rocker levers 40, 41. should be controllable from the driver's seat of the car. As a simple expedient to give desired control of shaft 57 I have shown (Fig. 1) such shaft 57 as connected by a universal joint 62 with shaft 63 that is suitably geared, preferably one-to-one, as at 64, to another shaft 65, that extends through, or conveniently adjacent to, steering post 11 and that carries at its upper end a setting handle 66 arranged to travel over an indicating dial 67 with respect to which said handle may preferably be latched in any of its five principal positions, as by means of any suitable latch as shown at 68 in Fig. 4. It will be understood, of course, that in such details the installation will be varied to suit the particular conditions imposed by the automobile construction.

The means employed for rocking the levers 40 and 41 may be varied, but I prefer to have said levers normally held in, and spring returned to, outward position, as by a spring 70 working on the lever 45. I prefer that the lever 45 should be connectible to a foot power lever for movement against the tension of its spring 70 and that, when it reaches the appropriate point bring the slide-moving rocker arms 40 and 41 to the end of their inthrow, said lever 45 should automatically release itself for spring return to normal position; to the end that the actual shifting movement of the appropriate slide to effect a desired gear relation may be quickly and uniformly effected. Also it is highly desirable that the movement of the same foot lever that rocks the levers 40 and 41 inward should also disengage the engine clutch so that when the gear-engagement is made the gearing may not be receiving power from the engine, and therefore I have shown the one way movement of lever 45 to be governed by the movement of the clutch shifting lever 16.

Specifically an arm 72 pivoted to the clutch shifting lever 16 extends through an opening 73 in the lever 45, and is provided with a latch lug 75 to engage the lower edge of aperture 73. Preferably some lost motion is allowed before this engagement takes place, so that the clutch may be released before the gear-shifters are moved at all. A tripping lug 76 is formed on lever 45 so that, as shown in Fig. 8, when arm 72 has pulled lever 45 forward to the full extent of its intended throw, lug 76 will raise the rod 72, automatically disengaging lug 75 from the lever 45 and so allowing spring 70 to snap the lever 45 back to normal position.

In resumé of the operation of the device: To set the apparatus to throw the gear into any one of its five positions (neutral, three speeds forward or reverse) the operator moves his indicator handle 66 to the selected position, thereby turning shaft 57 that carries the stop wings 58 and 58'. Assuming that "high" or third speed is desired, wing 58 is brought in the path of finger 55 of connector 48. This adjustment for desired selection may be made in advance at any time, as its only immediate effect is to rotate the shaft 57. To effect the desired gear connection in "high," the operator now merely depresses pedal 17. This rocks lever 16 forward so that first, the clutch 13 is thrown "out" and then rod 72 pulls forward lever 45 against the tension of its spring 70 to rock arms 40, 41 inward until the automatic release of rod 72 takes place and spring 70 snaps lever 45 back to normal position. As the levers 40 and 41 are rocked inward either tubular slide 34 or 35 that may theretofore have been out of neutral position, is moved to neutral, mid-position, and just before lever 40 reaches the end of its inthrow, finger 55 of connector 48 strikes the properly set wing 58, so that, as shown in Fig. 8, connector 48 is elevated, throwing holding pawl 53 out of the notch 52 in slide 34, and engaging the slide with the connector 48 for retraction. As the lever 40 reaches this extreme of inward movement, lug 76 on lever 45 shifts the lug 75 of rod 72 out of engagement with the lever 45, so that said lever 45 is spring impelled to normal position, the outthrow movement of levers 40 and 41 takes place, lever 40 carrying with it the slide 34 and so, through shifter 36, shifting the selective gear into "high." It will be noted that the acts above described all take place while the clutch lever 16 is being thrown forward against the tension of its spring, and consequently the engine clutch is disengaged when the shifting of the gears into the new relation takes place. Accordingly it is impossible for the driver to shift his gears with the power on.

While I have herein described in some detail a particular embodiment of my invention, it will be apparent to those skilled in the art that changes may be made in detail, without departure from the spirit and scope of the appended claims.

Having described my invention, what I claim is:

1. In a gear shifter of the character described, the combination of a shifter-slide, members working oppositely toward and from said slide adapted and arranged suitably to move said slide to mid-position on their instroke, means for selectively connecting either of said members with said slide to move it on the outstroke of said member, a power lever, means to connect said power lever with said slide-moving members to move the latter on their instroke, and automatic means for releasing said slide moving members from said power lever-connection and imparting outstroke motion to said slide moving means.

2. Gear shifting means comprising, in combination, a pair of slides, each movable from neutral mid-position in either direction, opposed slide-moving means movable oppositely in unison longitudinally with respect to said slides, and adapted and arranged suitably to move said slides to neutral position on their instroke, selectively operable means for connecting either slide and the appropriate slide moving means for movement of said slide in selected directions on the outstroke of said moving means, and means for actuating said slide moving means.

3. Gear shifting means comprising, in combination, a pair of slides, each movable from neutral mid-position in either direction, opposed slide-moving means movable oppositely in unison longitudinally with respect to said slides, and adapted and arranged suitably to move said slides to neutral position on their instroke, selectively operable means for connecting either slide and the appropriate slide moving means for movement of said slide in selected directions on the outstroke of said moving means, a power lever, means for connecting said power lever to move the slide moving means on their instroke, and means automatically to release said slide moving means from the power lever and to move the slide-moving means on their outstroke.

4. In a gear shifting means, the combination of tubular slides carrying shifting arms, and movable from a neutral mid-position in either direction opposed rocking arms beyond said slides, normally-disabled slide-engaging hooks on said rocker arms, extending into said slides, means for selectively controlling engagement of said hooks with the slides, and means for rocking said rocker arms oppositely in unison.

5. In a gear shifting means, the combination of tubular slides carrying shifting arms, and movable from a neutral mid-position in either direction, opposed rocking arms beyond said slides, normally-disabled slide-engaging hooks on said rocker arms, extending into said slides, means for selectively controlling engagement of said hooks with the slides, and means adapted for operation from the driver's station to rock said arms inward, and means automatically to disconnect said arms from the last said means and rock said arms outwardly.

6. A device of the character described, the combination of a slide, opposed rocker arms connectible with said slide to move the same inward, selective means for connecting either arm with said slide to move said slide outward, and means for rocking said arms in unison including a lever member (45) a power lever, a latching connection between said power lever, and the first said lever, means automatically to break said latch connection at the end of the inthrow of the rocker arm, and a spring for restoring the first said lever.

7. In a device of the character described, a tubular slide having hook-and-pawl-receiving surfaces, a rocker arm, a hook carried by said rocker arm extending into said tubular slide and normally held out of engagement with the latter, a holding pawl normally operatively engaging said slide, and selectively operable means for moving said hook to engage the slide and disengage the holding pawl therefrom, and means for rocking the rocker arm.

8. In a gear shifting mechanism, the combination of a plurality of shifter slides, rocker arms oscillatable oppositely in unison toward and from said slides, normally disabled slide-engaging hooks carried by said rocker arm, means to oscillate said rocker arm, and means selectively to operate any one of said hooks, comprising a rotatable shaft and hook controlling means on said shaft arranged for coöperation with any one of said hooks according to the rotary position of the shaft.

9. The combination, in a device of the character described, of a tubular slide, a rocker arm, a bell crank hook on said rocker arm adapted to engage the slide, but normally disengaged therefrom, a rotatable shaft, and a stop-wing on said shaft arranged when interposed in the path of the bell crank end of said hook to move said hook to slide-engaging position.

10. The combination with gear shifting means, of a member movable in one direction to store power and movable in the reverse direction by the release of said stored power, a plurality of pawls for respectively actuating said shifting means to different positions of adjustment by the movement of said movable member under the actuation of the released power, and means for selecting the particular pawl for actuating said shifting means.

In testimony whereof I hereunto set my hand in the presence of two subscribing witnesses.

STEAD A. ASQUITH.

In the presence of—
 STANLEY C. COOK,
 MARY F. ALLEN.